United States Patent
Dower et al.

(10) Patent No.: US 9,640,958 B2
(45) Date of Patent: May 2, 2017

(54) REMOVABLE ADHESIVE BACKED DUCTS FOR CABLING AND A REMOVAL METHOD

(75) Inventors: William V. Dower, Austin, TX (US); James L. Bries, Cottage Grove, MN (US); Donald K. Larson, Cedar Park, TX (US); Victor J. Borer, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 816 days.

(21) Appl. No.: 13/640,456

(22) PCT Filed: Mar. 24, 2011

(86) PCT No.: PCT/US2011/029715
§ 371 (c)(1),
(2), (4) Date: Oct. 10, 2012

(87) PCT Pub. No.: WO2011/129972
PCT Pub. Date: Oct. 20, 2011

(65) Prior Publication Data
US 2013/0025929 A1    Jan. 31, 2013

Related U.S. Application Data

(60) Provisional application No. 61/324,147, filed on Apr. 14, 2010.

(51) Int. Cl.
*H02G 3/12* (2006.01)
*B32B 38/10* (2006.01)
(Continued)

(52) U.S. Cl.
CPC ......... *H02G 3/0481* (2013.01); *G02B 6/4459* (2013.01); *H02G 3/266* (2013.01);
(Continued)

(58) Field of Classification Search
CPC .... G02B 6/4459; H02G 3/0481; H02G 3/266; H02G 3/305; Y10T 156/1142; Y10T 428/2852; Y10T 428/2891
(Continued)

(56) References Cited

U.S. PATENT DOCUMENTS 2,066,242 A    12/1936   Abbott
3,133,753 A     5/1964   Goodman
(Continued)

FOREIGN PATENT DOCUMENTS

DE    33 31 016 A1    10/1984
DE    44 10 558 A1     9/1995
(Continued)

OTHER PUBLICATIONS

Publication: "Flat Cable System is Introduced," 3M Megaphone Newspaper, Dec. 1962; 1 page.
(Continued)

*Primary Examiner* — Hoa C Nguyen
*Assistant Examiner* — Amol Patel
(74) *Attorney, Agent, or Firm* — Gregg H. Rosenblatt

(57) ABSTRACT

A duct for distributing one or more telecommunication lines comprises an elongated body having a length and a conduit portion with a lengthwise bore formed therein. The conduit portion contains one or more telecommunication lines. The duct also includes a flange extending lengthwise adjacent the main body to mount the duct to a mounting surface, such as a wall. The duct also includes an adhesive layer disposed on a surface of the flange, the adhesive layer comprising a removable adhesive to permit removal of the duct from the mounting surface after mounting.

15 Claims, 10 Drawing Sheets

(51) Int. Cl.
  *B32B 7/06* (2006.01)
  *H02G 3/04* (2006.01)
  *G02B 6/44* (2006.01)
  *H02G 3/00* (2006.01)
  *H02G 3/30* (2006.01)

(52) U.S. Cl.
  CPC ........ *H02G 3/305* (2013.01); *Y10T 156/1142* (2015.01); *Y10T 428/28* (2015.01); *Y10T 428/2852* (2015.01); *Y10T 428/2891* (2015.01)

(58) Field of Classification Search
  USPC ........ 174/68.1, 68.3, 70 C, 70 R, 72 A, 480, 174/481
  See application file for complete search history.

(56) References Cited

U.S. PATENT DOCUMENTS

| | | | |
|---|---|---|---|
| 3,491,971 A | | 1/1970 | Fisher |
| 3,576,304 A | * | 4/1971 | Gillemot et al. ............ 248/74.2 |
| 3,654,379 A | | 4/1972 | Rodgers |
| 3,778,528 A | | 12/1973 | Heifetz |
| 4,459,165 A | | 7/1984 | Meis |
| 4,606,595 A | | 8/1986 | Dola |
| 4,618,741 A | | 10/1986 | Bramwell |
| 4,804,020 A | | 2/1989 | Bartholomew |
| 4,911,525 A | | 3/1990 | Hicks |
| 5,278,356 A | * | 1/1994 | Miller ........................ 174/117 A |
| 5,367,122 A | | 11/1994 | de Olano |
| 5,516,581 A | * | 5/1996 | Kreckel et al. ............ 428/317.3 |
| 5,593,756 A | | 1/1997 | Miller |
| 5,678,609 A | | 10/1997 | Washburn |
| 5,692,545 A | | 12/1997 | Rodrigue |
| 5,702,994 A | | 12/1997 | Klosel |
| 5,721,394 A | | 2/1998 | Mulks |
| 5,886,295 A | | 3/1999 | Carino |
| 6,259,034 B1 | | 7/2001 | Arthur |
| 6,332,479 B1 | * | 12/2001 | Ko ........................ H02G 3/0487 138/108 |
| 6,504,098 B2 | | 1/2003 | Seamans |
| 6,541,089 B1 | | 4/2003 | Hamerski |
| 6,545,215 B2 | | 4/2003 | Young |
| 6,569,521 B1 | | 5/2003 | Sheridan |
| 6,641,910 B1 | | 11/2003 | Bries |
| 6,911,597 B2 | | 6/2005 | Seamans |
| 7,035,511 B1 | | 4/2006 | Rhoney |
| 7,078,616 B2 | | 7/2006 | Roesch |
| 7,119,280 B1 | | 10/2006 | Ray |
| 7,341,403 B2 | | 3/2008 | Tsuchiya |
| 7,369,738 B2 | | 5/2008 | Larson |
| 7,397,993 B1 | | 7/2008 | Navé |
| 7,406,241 B1 | | 7/2008 | Opaluch |
| 7,668,432 B2 | | 2/2010 | Mullaney |
| 8,050,527 B2 | | 11/2011 | Noddings |
| 8,203,078 B1 | * | 6/2012 | Fulco ........................ H02G 3/0431 138/118.1 |
| 8,420,942 B2 | * | 4/2013 | Short ........................ H02G 3/0412 174/135 |
| 2002/0181905 A1 | | 12/2002 | Yoshida |
| 2003/0049008 A1 | | 3/2003 | Zeidan |
| 2003/0094302 A1 | * | 5/2003 | Magyar ............... H02G 3/0487 174/68.3 |
| 2005/0074223 A1 | * | 4/2005 | Moore ............... H02G 3/0481 385/147 |
| 2005/0213920 A1 | | 9/2005 | Tanaka |
| 2008/0069513 A1 | | 3/2008 | Desanti |
| 2008/0135159 A1 | | 6/2008 | Bries |
| 2008/0159740 A1 | | 7/2008 | Bell |
| 2008/0187276 A1 | | 8/2008 | Roberts |
| 2008/0226236 A1 | | 9/2008 | Pepin |
| 2008/0280037 A1 | | 11/2008 | Sheridan |
| 2009/0003782 A1 | | 1/2009 | Bell |
| 2009/0060445 A1 | | 3/2009 | Mullaney |
| 2009/0211171 A1 | | 8/2009 | Summers |
| 2009/0229732 A1 | | 9/2009 | Determan |
| 2009/0294016 A1 | | 12/2009 | Sayres |
| 2009/0324188 A1 | | 12/2009 | Berglund |
| 2010/0109174 A1 | | 5/2010 | Abernathy |
| 2010/0243096 A1 | | 9/2010 | Berglund |
| 2010/0247052 A1 | | 9/2010 | Berglund |

FOREIGN PATENT DOCUMENTS

| | | |
|---|---|---|
| DE | 196 03 262 A1 | 7/1997 |
| DE | 19843263 A1 | 3/2000 |
| EP | 0 490 609 A2 | 6/1992 |
| EP | 0 992 826 A2 | 4/2000 |
| EP | 1 447 893 A1 | 8/2004 |
| FR | 1 304 739 A1 | 8/1962 |
| FR | 1304739 | 8/1962 |
| FR | 2 097 002 A1 | 3/1972 |
| FR | 2 141 599 A1 | 1/1973 |
| FR | 2 418 973 A1 | 9/1979 |
| FR | 2418973 | 9/1979 |
| FR | 2 568 730 A1 | 2/1986 |
| FR | 2 688 897 B1 | 9/1993 |
| FR | 2 916 284 A1 | 11/2008 |
| GB | 2 352 867 A | 2/2001 |
| GB | 2 377 089 A | 12/2002 |
| GB | 2 409 587 A | 6/2005 |
| JP | 59-031902 A | 2/1984 |
| JP | 4016262 B2 | 12/2007 |
| JP | 2008-309894 A | 12/2008 |
| KR | 20-0399079 Y1 | 10/2005 |
| WO | WO 83/01868 | 5/1983 |
| WO | WO 85/04981 | 11/1985 |
| WO | WO 93/14545 | 7/1993 |
| WO | WO 97/44872 | 11/1997 |
| WO | WO 03/046622 | 6/2003 |
| WO | WO 2005/096054 | 10/2005 |
| WO | WO 2008/124293 | 10/2008 |
| WO | WO 2009/018421 | 2/2009 |
| WO | WO 2009/114683 | 9/2009 |
| WO | WO 2009/158346 | 12/2009 |
| WO | WO 2010/068585 | 6/2010 |

OTHER PUBLICATIONS

Publication: "New Flat Cable is Available," 3M Megaphone Newspaper, Jun. 1964; 1 page.
Publication: "3M Cable Unsnarls Wiring Woes with the Neat System," The Tartan Magazine, 3rd Quarter 1965; 3 pages.
Product Catalog, "Multilink® Plastic and Steel Raceway System", pp. 219-262; MultiLink, Inc., Elyria, OH <http://www.gomultilink.com/Catalog/Default.aspx> [downloaded from the internet on Dec. 3, 2009].

* cited by examiner

REMOVABLE ADHESIVE BACKED DUCTS FOR CABLING AND A REMOVAL METHOD

RELATED APPLICATION

This application claims the benefit of U.S. Provisional Patent Application No. 61/324,147, the disclosure of which is incorporated by reference in its entirety.

BACKGROUND OF THE INVENTION

Field of the Invention

The present invention is directed to a duct having communications lines for telecommunication cabling applications that includes a removable adhesive layer. The present invention is also directed to a method of removing an adhesive-backed duct after mounting it to a mounting surface.

Background

Several hundred million multiple dwelling units (MDUs) exist globally, which are inhabited by about one third of the world's population. Due to the large concentration of tenants in one MDU, Fiber-to-the-X ("FTTX") deployments to these structures are more cost effective to service providers than deployments to single-family homes. Connecting existing MDUs to the FTTX network can often be difficult. Challenges can include gaining building access, limited distribution space in riser closets, and space for cable routing and management. Specifically, FTTX deployments within existing structures make it difficult to route cables within the walls or floors, or above the ceiling from a central closet or stairwell, to each living unit.

Conventionally, a service provider installs an enclosure (also known as a fiber distribution terminal (FDT)) on each floor, or every few floors, of an MDU. The FDT connects the building riser cable to the horizontal drop cables which run to each living unit on a floor. Drop cables are spliced or otherwise connected to the riser cable in the FDT only as service is requested from a tenant in a living unit. These service installations require multiple reentries to the enclosure, putting at risk the security and disruption of service to other tenants on the floor. This process also increases the service provider's capital and operating costs, as this type of connection requires the use of an expensive fusion splice machine and highly skilled labor. Routing and splicing individual drop cables can take an excessive amount of time, delaying the number of subscribers a technician can activate in one day, reducing revenues for the service provider. Alternatively, service providers install home run cabling the full extended length from each living unit in an MDU directly to a fiber distribution hub (FDH) in the building vault, therefore encompassing both the horizontal and riser with a single extended drop cable. This approach creates several challenges, including the necessity of first installing a pathway to manage, protect and hide each of the multiple drop cables. This pathway often includes very large (e.g., 2 inch to 4 inch to 6 inch) pre-fabricated crown molding made of wood, composite, or plastic. Many of these pathways, over time, become congested and disorganized, increasing the risk of service disruption due to fiber bends and excessive re-entry.

In addition, further physical and aesthetic challenges exist in providing the final drop to and from each individual living unit. Also, because of their size, many conventional indoor optical network terminals (ONTs) are often placed in the closets of living units out of normal view. This type of arrangement requires that a service provider run new cabling (such as coaxial cables, cat 5 cables, and others) from the closet to the existing wiring in the living unit to activate the ONT to provide service. As newer ONTs have become smaller in physical size, they can be placed outside of closets and into main living areas.

SUMMARY

According to an exemplary aspect of the present invention, a duct for distributing one or more communication lines comprises an elongated body having a length and a conduit portion with a lengthwise bore formed therein, the conduit portion containing one or more communication lines. The duct also includes a flange extending lengthwise adjacent the elongated body to mount the duct to a mounting surface. The duct also includes an adhesive layer disposed on a surface of the flange, the adhesive layer comprising a removable adhesive to permit removal of the duct from the mounting surface after mounting.

In another aspect, the elongated body is formed from a flexible material.

In another aspect, the adhesive layer comprises a stretch release adhesive. In yet another aspect, the stretch release adhesive comprises an acrylic-based adhesive. In yet another aspect, the stretch release adhesive comprises a rubber-based adhesive. In yet another aspect, the stretch release adhesive comprises a silicone-based adhesive.

In another aspect, the stretch release adhesive comprises a highly extensible backing.

In another aspect, the adhesive layer further includes a liner that is removable prior to mounting the duct on the mounting surface.

In another aspect, the elongated body has a form factor (length versus width) of greater than 100 to 1.

In another aspect, the duct includes at least one additional conduit, wherein the first conduit is configured to contain at least a first optical fiber communication line and the additional conduit is configured to contain at least a second optical fiber communication line.

In another aspect, the one or more communication lines includes an electrical wire.

In another aspect, the adhesive layer comprises first and second adhesive layers each disposed on a different portion of the surface of the flange.

According to another aspect of the invention, a removably mountable article comprises an article having an elongated body having a form factor (length versus width) of at least 25 to 1 and a bottom surface along a length of the elongated body. The removably mountable article also includes an adhesive layer disposed on the mounting surface, the adhesive layer comprising a removable adhesive to permit removal of the article from a mounting surface after mounting.

In another aspect, the elongated body is formed from a flexible material.

In another aspect, the elongated body is formed from a material that is at least substantially rigid.

In another aspect, the elongated body has a form factor (length versus width) of at least 50 to 1.

In another aspect, the elongated body has a form factor (length versus width) of greater than 100 to 1.

In another aspect, the adhesive layer comprises a stretch release adhesive. In yet another aspect, the stretch release adhesive comprises an acrylic-based adhesive. In a further aspect, the stretch release adhesive comprises a rubber-based adhesive. In a further aspect, the stretch release adhesive comprises a silicone-based adhesive.

In another aspect, the stretch release adhesive comprises a highly extensible backing.

In another aspect, the adhesive layer further includes a liner that is removable prior to mounting the duct on the mounting surface.

In another aspect of the invention, a method of removing a duct mounted to a mounting surface is provided. The duct further includes an elongated body having a length and a conduit portion with a lengthwise bore formed therein containing one or more communication lines, a flange extending lengthwise adjacent the elongated body, and an adhesive layer disposed on a surface of the flange, the adhesive layer comprising a removable adhesive. The removal method comprises stretching a portion of the adhesive layer in a lengthwise direction substantially along a plane of the mounting surface and pulling the portion of the adhesive layer away from the duct at a substantial angle from the lengthwise direction along the plane of the mounting surface.

In another aspect, the substantial angle is at least 30° from the lengthwise direction. In yet another aspect, the substantial angle is from about 45° to about 135° from the lengthwise direction.

In another aspect, the duct is at least substantially rigid. In yet another aspect, the duct is flexible.

In another aspect, the method further includes pulling the portion of the adhesive layer away from the duct at a substantial angle away from the plane of the mounting surface.

According to another aspect of the invention, a method of removing a duct mounted to a mounting surface is provided. The duct includes an elongated body having a length and a conduit portion with a lengthwise bore formed therein containing one or more communication lines, a flange extending lengthwise adjacent the elongated body, and an adhesive layer disposed on a surface of the flange, the adhesive layer comprising a removable adhesive. The method comprises stretching a portion of the adhesive layer in a lengthwise direction substantially along a plane of the mounting surface, pulling the duct in line with the lengthwise direction and at a first substantial angle away from the plane of the mounting surface, and pulling the portion of the adhesive layer away from the duct in line with the lengthwise direction and at a second substantial angle away from the plane of the mounting surface.

According to another aspect of the invention, a method of removing an article mounted to a mounting surface is provided. The article includes an elongated body having a form factor (length versus width) of at least 25 to 1 and a bottom surface along a length of the elongated body and an adhesive layer disposed on the bottom surface. The method comprises stretching a portion of the adhesive layer in a lengthwise direction substantially along a plane of the mounting surface and pulling the portion of the adhesive layer away from the article at a substantial angle from the lengthwise direction along the plane of the mounting surface.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
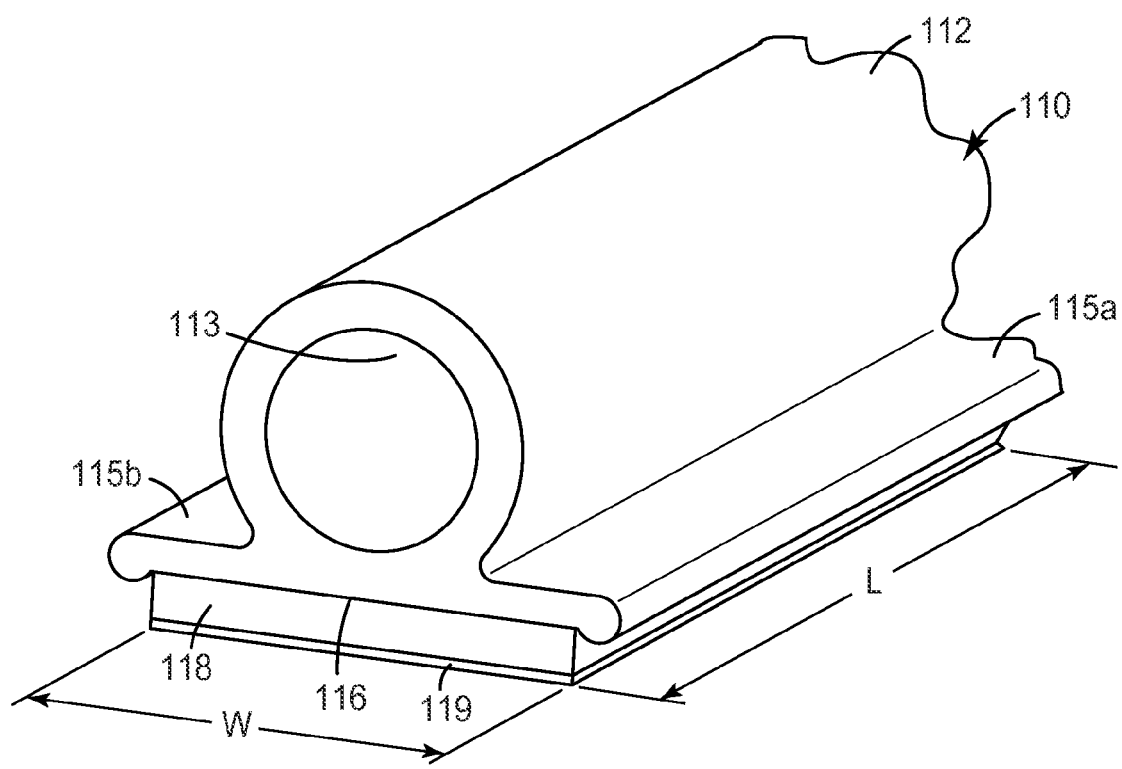
FIG. 1A is an isometric view of an exemplary duct according to a first aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a duct for distributing one or more communication lines for telecommunication applications at an MDU (which for purposes of this application can include a typical MDU, multiple tenant unit (MTU), school, hotel, hospital or other location) or another facility. The duct includes at least one conduit for accommodating one or more communication lines that can include optical fiber, electrical wiring, or a combination thereof. The duct further includes a removable adhesive layer which allows the service provider to remove the duct after it has been mounted to a mounting surface, such as a wall. In addition, the removable adhesive layer can be designed to be removed without damaging the wall and to leave minimal residue upon its removal. Herein, the term "living unit" is not limited to a domicile or residence, but can include an office, conference room, hotel room, hospital room, school room or other similar location. The various ducts described herein provide communication lines that can be used to connect with telecommunication drop lines from individual living units, such as residences, classrooms, or offices, within the MDU and/or to provide a final drop within the living unit in an MDU. The ducts described herein can provide a low impact profile for better aesthetics. For example, the ducts can be installed on the walls of a corridor or hallway in an existing building to provide new communications wiring to individual residences and offices and/or within the individual residences and offices.

In a more general sense, the present invention also provides a removable adhesive backed article for use in communications or non-communications based applications. The article can include a removable adhesive layer which allows a user to remove the article in a straightforward manner after it has been mounted to a mounting surface or similar substrate. In alternative aspects, both flexible and stiff articles having elongated form factors can be removably mounted to the mounting surface.

In more detail, a close-up isometric view of an exemplary duct 110 is shown in FIG. 1A. Duct 110 is an elongated structure that may have a length (L) of up to several tens of meters (depending on the application), while the width W is about 5 mm to about 50 mm. Thus, in a preferred aspect, the duct can have a shape or form factor (L vs. W) of at least an order of magnitude, and in many applications, a form factor of at least about 25 to 1, a form factor of at least about 50 to 1, or a form factor of at least 100 to 1. As the duct described herein can be supplied to the installer in mass spooled form, the length of the duct is limited only by logistical constraints.

Duct 110 includes a main body having a conduit portion 112 with a bore 113 provided therethrough. The bore is sized to accommodate one or more communications lines disposed therein. In a preferred aspect, in use, the duct 110 comprises one or more communications lines, such as buffer coated optical fibers. In use, the duct 110 can be prepopulated with one or more communications lines. In addition, duct 110 may also be populated with at least one electrical power line.

While conduit portion 112 can have a generally circular cross-section, in alternative embodiments it may have another shape, such as a rectangle, square, triangle, oval, or other polygonal shaped cross-section.

In one aspect, duct 110 is a structure formed from a polymeric material, such as a polyolefin, a polyurethane, a polyvinyl chloride (PVC), or the like. Additives, such as flame retardants, stabilizers, and fillers can also be incorporated as required for a particular application. In a preferred aspect, duct 110 is flexible, so that it can be guided and bent around corners and other structures without cracking or splitting. Duct 110 can be continuously formed using a conventional extrusion process.

In a preferred aspect, the duct 110 can be provided to the installer without a slit. In an alternative aspect, duct 110 can further include a slit (not shown) that runs the longitudinal length of the duct. The slit can provide access for inserting or removing the fiber and may be positioned at a selected position (e.g., base, top or middle) on the conduit portion. In a further alternative aspect, the slit can be formed within overlapping wall surfaces of the conduit to ensure the communications lines are properly restrained within the conduit portion. This structure can further promote a more aesthetically pleasing duct. This alternative slit can be opened by the installer to access the communications lines within the conduit portion. In a further alternative, duct 110 can include multiple longitudinal slits for access or separation of services (e.g., for use with a divided conduit). In a further alternative aspect, the conduit portion 112 can be directly extruded over the communications line(s) in an over jacket extrusion process.

Duct 110 also includes a flange or similar flattened portion to provide support for the duct 110 as it is installed on or mounted to a wall or other mounting surface, such as a floor, ceiling, or molding. In most applications, the mounting surface is generally flat. The mounting surface may have texture or other structures formed thereon. In other applications, the mounting surface may have curvature, such as found with a pillar or column. The flange extends along the longitudinal axis of the duct as shown in FIG. 1A. Exemplary duct 110 includes a double flange structure, with flange portions 115a and 115b, positioned (in use) below the centrally positioned conduit portion. In an alternative aspect, the flange can include a single flange portion. In alternative applications, a portion of the flange can be removed for in-plane and out-of-plane bending.

In a preferred aspect, the flange 115a, 115b includes a rear or bottom surface 116 that has a generally flat surface shape. This flat surface provides a suitable surface area for adhering the duct 110 to a mounting surface, a wall or other surface (e.g., dry wall or other conventional building material) using an adhesive layer 118.

In a preferred aspect of the present invention, the adhesive layer 118 comprises a removable adhesive, such as a stretch release adhesive. By "removable adhesive" it is meant that the duct 110 can be mounted to a mounting surface (preferably, a generally flat surface, although some surface texture and/or curvature are contemplated) so that the duct 110 remains in its mounted state until acted upon by an installer/user to remove the duct from its mounted position. Even though the duct is removable, the adhesive is suitable for those applications where the user intends for the duct to remain in place for an extended period of time.

It is noted that the adhesive layer 118 may comprise a single layer structure or a multi-layer structure having a pressure sensitive adhesive composition disposed thereon. For example, adhesive layer 118 can comprise a backing that includes a highly extensible material layer with one or more pressure sensitive adhesive compositions disposed thereon. The backing may comprise a material, such as a foam material, that elongates when stretched and is highly extensible. The backing may comprise a film or a combination of a foam material and a film with any suitable thickness, composition, and opaqueness or clarity. The backing can be a single layer of film, a single layer of foam, multiple layers of film, multiple layers of foam, or multiple layers of foam and film.

A film layer of a backing can be bonded to the layer of foam using any suitable mechanism including, e.g., coextruding the film and the foam layer, co-molding, extrusion coating, joining through an adhesive composition, joining under pressure, joining under heat, and combinations thereof. Useful adhesive compositions for bonding a film layer to the foam layer include the adhesive compositions set forth below. Where only one polymeric film or foam layer of a multi-layer backing is intended to be stretched to effect debonding, that layer should exhibit sufficient physical properties and be of a sufficient thickness to achieve that objective.

The backing for the adhesive layer 118 can be selected to have suitable mechanical properties for use as a stretch release adhesive. For example, the backing can be selected so that it can be stretched (elongated) in a first direction (e.g., a lengthwise direction) at least 50 percent without breaking. That is, at least one dimension such as the length of the backing can be increased through stretching at least 50 percent without breaking. In some embodiments, the backing can be stretched at least 100 percent, at least 150 percent, at least 200 percent, at least 300 percent, at least 400 percent, or at least 500 percent without breaking. The backing can often be stretched up to 1200 percent, up to 1000 percent, up to 800 percent, up to 750 percent, or up to 700 percent without breaking. These relatively large elongation values facilitate stretch releasing of the adhesive layer 118 after being adhered to the duct and/or the mounting surface.

The Young's Modulus of the backing can be an indicator of the resistance of the backing to stretching. The Young's modulus is often at least about 1,000 psi (about 7 MPa), at least about 2,500 psi (about 17 MPa), or even at least about 3,000 psi (about 21 MPa), no greater than about 72,500 psi (about 500 MPa), or no greater than about 50,000 psi (about 345 MPa). For some film backing layers such as those that contain a poly(alkylene) copolymer, the Young's Modulus is often in the range of about 10 MPa to about 75 MPa. For example, the Young's Modulus can be in the range of 20 to 75 MPa, in the range of 20 to 60 MPa, in the range of 20 to 50 MPa, or in the range of 25 to 50 MPa. The Young's Modulus can be measured, for example, using method ASTM D790-07 or ASTM D882-02.

In many applications, the foam and/or film backings that are utilized in adhesive layer 118 are prepared from a polymeric material such as, for example, a polyolefin (e.g., polyethylene such as high density polyethylene, low density polyethylene, linear low density polyethylene, and linear ultra low density polyethylene, polypropylene, and polybutylene), vinyl copolymers (e.g., polyvinyl chloride and polyvinyl acetates), olefinic copolymers (e.g., ethylene/methacrylate copolymers, ethylene/vinyl acetate copolymers, and ethylene/propylene copolymers), acrylonitrile-butadiene-styrene copolymers, acrylic polymers and copolymers, polyurethanes, and combinations or blends thereof. Exemplary blends include polypropylene/polyethylene blends, polyurethane/polyolefin blends, polyurethane/polycarbonate blends, and polyurethane/polyester blends.

Other suitable blends can include, for example, blends of thermoplastic polymers, elastomeric polymers and combinations thereof. Suitable blends can include, for example, styrene-butadiene copolymers, polychloroprenes (i.e., neoprene), nitrile rubbers, butyl rubbers, polysufide rubbers, cis-1,4-polyisoprenes, ethylene-propylene terpolymers (e.g., EPDM rubber), silicone rubbers, silicone polyurea block copolymers, polyurethane rubbers, polyisobutylenes, natural rubbers, acrylate rubbers, thermoplastic rubbers (e.g., styrene-butadiene block copolymers and styrene-isoprene-styrene block copolymers), and thermoplastic polyolefin rubber materials.

These stretch release adhesives having a layer of foam, film or other highly extensible material can form suitable adhesion with mounting surfaces that have roughened or textured surfaces having indentations, irregularities and the like. Adhesive layer 118 may also comprise a polymer film layer disposed on a major surface of the backing. In one aspect, the polymer film layer is highly extensible.

In particular, the stretch release adhesive layer can comprise a stretch releasing pressure sensitive adhesive, such as an acrylate-based adhesive, such as one or more of those described in U.S. Publ. No. 2008/0280037, incorporated by reference herein in its entirety. Alternatively, the stretch release adhesive may comprise a silicone-based adhesive or a rubber-based adhesive. Suitable stretch release adhesives are described in U.S. Publ. Nos. 2008/0135159 and 2009/0229732 and U.S. Pat. Nos. 6,569,521 and 6,641,910, each of which is incorporated by reference herein in its entirety.

For example, the adhesive may comprise at least one of tackified rubber adhesives, such as natural rubber, olefins, silicones, polyisoprene, polybutadiene, polyisobutylene, polyurethanes, styrene-isoprene-styrene and styrene-butadiene-styrene block copolymers, and other elastomers; and tackified or untackified acrylic adhesives such as copolymers of isooctylacrylate and acrylic acid. In other aspects, the adhesive may comprise at least one of crosslinked acrylic copolymer, acrylic block copolymer, silicone poly urea, silicone poly oxamide, and block rubber. Such adhesives may be coated onto a backing to form the adhesive layer 118, or such adhesives may be used to form an adhesive layer in the form of a single homogeneous layer of adhesive (i.e. without a backing layer). Suitable adhesives are described in PCT Publ. No. WO 2009/114683, incorporated by reference herein in its entirety.

In addition, the adhesive layer 118 may be selected based on the intended surface mounting application. For example, for high surface energy wall surfaces, such as tile and glass, especially those that may be exposed to water, a silicone-based stretch release adhesive may be preferable. In another example, for vinyl-based wall surfaces, such as wall-papered surfaces, an acrylic-based stretch release adhesive may be preferred. In another example, for painted wall surfaces, such as painted drywall, a rubber-based or an acrylic-based stretch release adhesive may be preferred.

In addition, suitable stretch release adhesives may be cleanly removable, so that the mounting surface is substantially free of adhesive residue (and physical damage) upon removal of the duct.

In another preferred aspect, the adhesive layer may also include a removable liner 119. In use, the liner can be removed and the adhesive layer 118 can be applied to a mounting surface. A method for removing the duct is described in greater detail below.

In an alternative aspect, the adhesive layer 118 may include one or more tacky or non-tacky tabs (not shown) formed at various locations along the length of the duct 110 that extend beyond the edge of the duct. For example, the tab can be a part of the backing portion of the adhesive layer 118 (i.e., an extension of the backing), a part of at least one adhesive portion of the adhesive layer 118 (i.e., an extension of the adhesive), attached to the backing, attached to at least one adhesive, or a part of both the backing and at least one adhesive (i.e., an extension of both the backing and at least one adhesive).

The tab is usually pulled in a direction that is parallel to or substantially parallel to the surfaces of the duct and mounting surface. That is, the tab is pulled in a direction that is 0 degrees, less than 5 degrees, less than 10 degrees, less than 15 degrees, less than 20 degrees, less than 25 degrees, less than 30 degrees, or less than 35 degrees. The tab often includes a part of the backing portion of the adhesive layer 118. In some embodiments, the tab is formed from a second region of the backing that extends beyond a first region of the backing that is in contact with the adhesive. The tab is often non-tacky in these embodiments. In other embodiments, the tab includes the backing and at least one adhesive. The tab is often tacky in these embodiments. A tacky tab can be made non-tacky by covering the tab region with a non-tacky material.

Pulling on the tab causes the adhesive layer 118 to elongate or stretch. Stretching reduces the volume of the adhesive layer 118 in the region between the duct and the mounting surface and facilitates release of the adhesive layer 118 from one or both substrates. Pulling on the tab can release the adhesive layer 118 from both substrates if the adhesive has sufficient cohesive strength, if the adhesive adheres more strongly to the backing than to the duct and/or mounting surface, and if the adhesive layer 118 can be elongated sufficiently to reduce its volume between the duct and mounting surface without breaking or snapping back into its original position or dimensions. The stretched adhesive layer can be removed from between the duct and mounting surface. The adhesive layer 118 preferably can be stretched at least 50 percent in a first direction (often the first direction is lengthwise and the length can be increased at least 50 percent) without breaking or snapping under the stretch releasing conditions. Thus, with this construction, a user may grab and pull a tab to initiate the duct removal process.

Figure 1B:
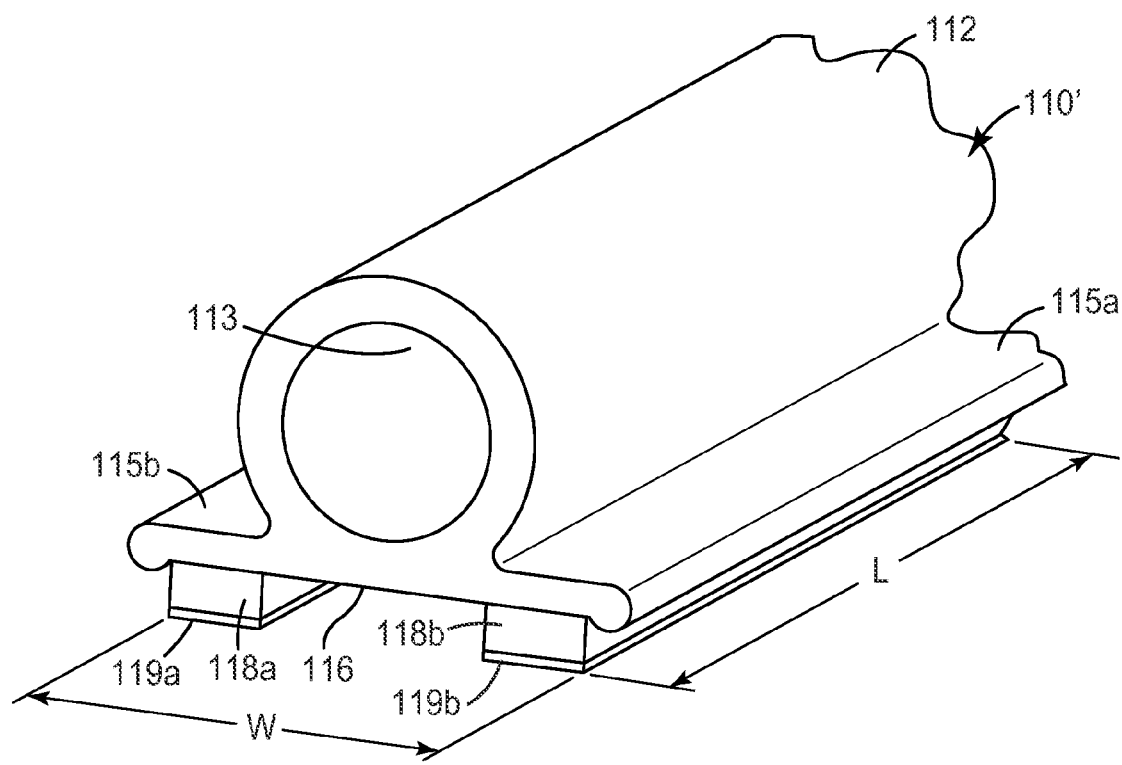
FIG. 1B is an isometric view of another exemplary duct according to an aspect of the invention.

As shown in FIG. 1A, adhesive layer 118 can be constructed as a single adhesive layer. Alternatively, as is shown in FIG. 1B, duct 110' can include two adhesive layers 118a and 118b, where adhesive layer 118a is disposed on the bottom surface of flange 115a and adhesive layer 118b is disposed on the bottom surface of flange 115b. The adhesive layers 118a, 118b may each also include removable liners 119a and 119b, respectively. This adhesive layer construction can be particularly useful for ducts with wider widths.

One or more communication lines can be disposed within duct 110 for accessing and connecting to one or more drop wires or drop fibers of a particular living unit or as the communication line(s) within a living unit. The communication fiber(s) can be accessed either through a separate window cut made to the conduit portion of the duct or through a slit already formed in duct 110, depending on the particular configuration of the duct. The communication lines can comprise optical fibers, electrical wires, coaxial/micro-coaxial cable, or a combination of these, for data, video, and/or telephone signal transmission. In one aspect, the communications lines can comprise discrete (loose) or ribbonized fiber.

In one aspect, the communications fiber comprises a tight bend radius, 900 μm buffered optical fiber. Such an optical fiber cable is commercially available as BendBright XS™ Single Mode Optical Fiber, from Draka Communications. Also in this aspect, an exemplary drop cable comprises a 2.9 mm jacketed drop cable commercially available as ez Patch cabling and ez Drop cabling from Draka Communications. A coupling or adapter can be used to connect the telecommunications line to a drop fiber cable. In an exemplary aspect, the telecommunications fiber is field terminated with an optical fiber connector, such as described in U.S. Pat. No. 7,369,738. Other optical fiber connectors, such as SC-APC, SC-UPC, LC, or MTP/MPO, can be utilized.

The drop cable from the individual living unit can be a conventional fiber cable such as a 2.9 mm jacketed fiber cable (e.g., an ez Drop Cable, available from Draka Communications) or blown fiber cabling (containing multiple discrete buffered fibers). The drop cable can be run in either direction (i.e., to or from a living unit), and can (or not) be pre-connectorized at one or two ends (e.g., a pre-connectorized pigtail of 2.9 mm jacket cable). A drop fiber cable can be terminated on one end at an optical network terminal (ONT), such as a single family unit optical network terminal (SFU ONT) or wall box (e.g., a 7342 Indoor Optical Terminal, available from Alcatel-Lucent).

Figure 3:
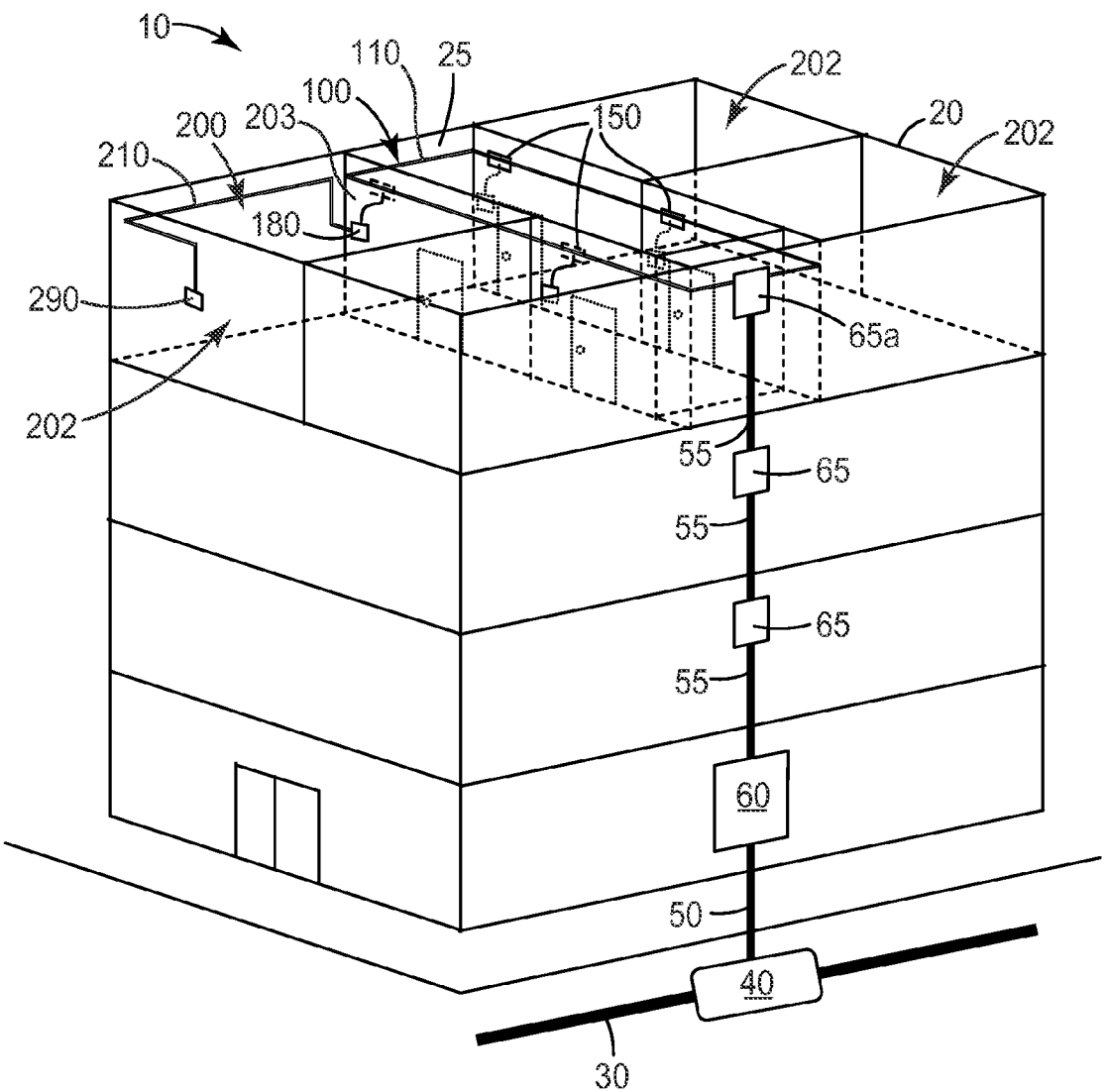
FIG. 3 is a schematic view of an exemplary MDU having a drop access location system and a final drop system utilizing the exemplary duct according to another aspect of the present invention.

FIG. 3 shows an example MDU 10 that can accommodate an exemplary drop access system using the duct described herein. MDU 10 is a multi-floor structure having a plurality of living units located therein. One example floor 20 has four living units having a common hallway 25. Feeder cable 30 brings communication lines to and from building 10. These feeder lines are spliced to the MDU's cabling at a splice closure 40. The building feeder lines 50 are distributed to the building from a fiber distribution hub (FDH) 60. Each floor includes a fiber distribution terminal (FDT) 65 that receives communication lines via riser cable 55. In the present example, a drop access system 100 coupling the communication lines from FDT 65a can be installed on hallway 25 such as is described above, where drop access boxes 150 can be disposed at each living unit and can receive one or more fiber optic communication lines from duct 110 (or, alternatively, duct 110', duct 210, duct 310, or duct 410). Exemplary drop access boxes are described in U.S. Publ. No. 2009/0324188, incorporated by reference herein in its entirety. For example, ducts 110, 110' shown in FIGS. 1A and 1B can be suitable for horizontal cabling applications.

As is also mentioned above, the ducts can described herein can accommodate electrical wire drops and hybrid combination drops as well. In alternative aspects, the ducts can be configured to supply at least one of uninterrupted DC power and uninterrupted AC power to an optical network terminal located in an individual living unit at the drop location.

Figure 4:
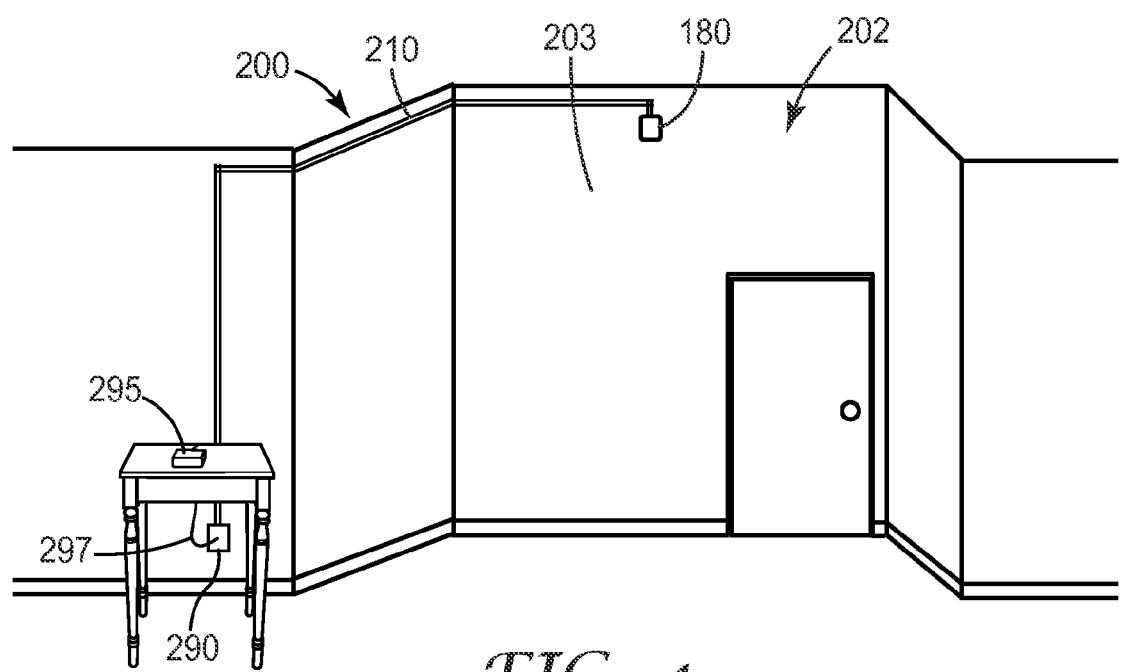
FIG. 4 is a schematic view of an exemplary final drop system utilizing the exemplary duct according to another aspect of the present invention.

In another exemplary aspect, FIG. 4 shows a schematic view of a system 200 for providing a final drop that is installed in a living unit 202 of an exemplary MDU 10 (see FIG. 3). Please note that while system 200 is preferably utilized in an MDU, it may also be utilized in a single family home or similar residence, as would be apparent to one of ordinary skill in the art given the present description.

The system 200 includes a conduit or duct 210 (or duct 110 (FIG. 1A) or duct 110' (FIG. 1B) or duct 310 (FIG. 2B) or duct 410 (FIG. 2C)) which contains one or more communications lines (such as drop fibers or lines, not shown in FIG. 4) for connection with the horizontal cabling of the MDU.

Figure 2A:
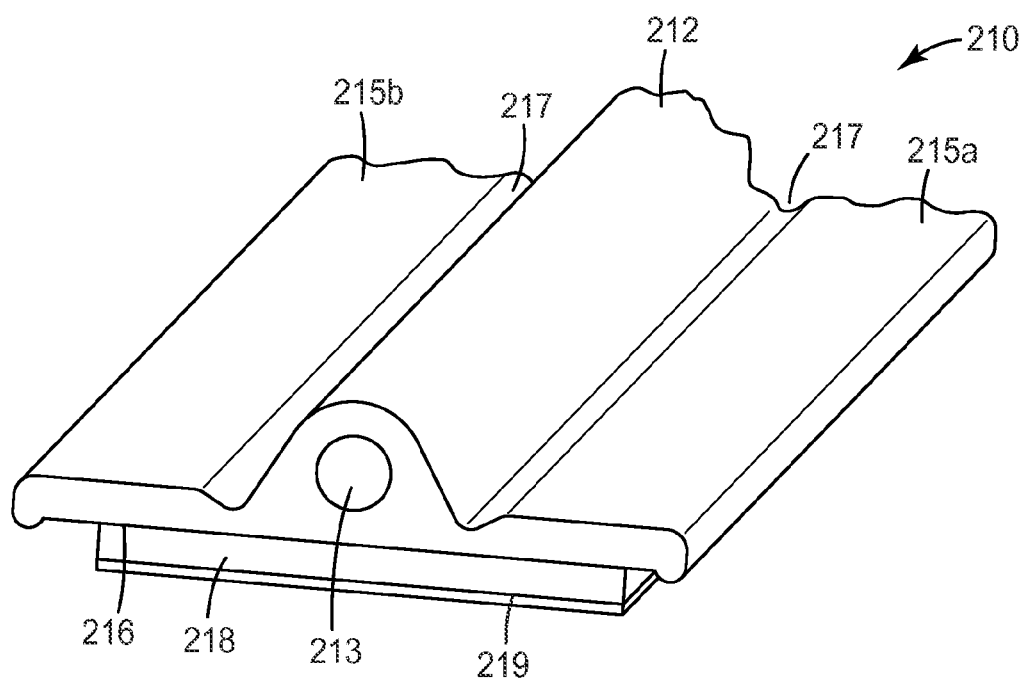
FIG. 2A is an isometric view of another exemplary duct according to another aspect of the invention.

FIG. 2A shows a more detailed view of duct 210, which includes a conduit portion 212 having a bore 213 extending longitudinally therethrough. Duct 210 is an elongated structure that may have a length (L) of up to several tens of meters (depending on the application). Duct 210 can have a relatively compact cross-section shape, with a lateral dimension from about 5 mm to about 30 mm, and a height of less than about 2 mm to about 10 mm. Thus, in a preferred aspect, the duct can have a shape or form factor (L vs. W) of at least an order of magnitude, and in many applications, a form factor of about at least 100 to 1.

The bore 213 is sized to accommodate one or more communication lines disposed therein. In a preferred aspect, the duct 210 comprises one or two communication lines, such as buffer coated optical fibers. In use, the duct 210 can be pre-populated with one or more communication lines. In addition, duct 210 may also be populated with at least one electrical power line.

While conduit portion 212 can have a generally circular cross-section, in alternative embodiments it may have another shape, such as a rectangle, square, triangle, oval, or other polygonal shaped cross-section. In one aspect, duct 210 is a continuous structure formed from a polymeric material such as polyvinyl chloride (PVC), making it flexible, flame retardant and robust. In one aspect, duct 210 can comprise an exemplary material such as a polyurethane elastomer, e.g., Elastollan 1185A10FHF. In one aspect, duct 210 can comprise a polyolefin material that optionally includes one or more flame retardant additives. As such, duct 210 can be guided and bent around corners and other structures without cracking or splitting. Duct 210 can be continuously formed using a conventional extrusion process.

Optionally, duct 210 can further include a slit (not shown) that runs the longitudinal length of the duct to provide access for inserting or removing the fiber(s).

Duct 210 also includes a generally flat flange structure having a first flange 215a and a second flange 215b extending laterally from the conduit portion to provide support for the duct 210 as it is adhered to a wall or other generally flat surface, such as a wall, floor, ceiling, or molding. In this aspect, the flange structure extends along the longitudinal axis of the duct and extends outward (in a wing shape) in both lateral directions. In this aspect, the conduit portion 212 is formed centrally with respect to the first and second flanges 215a, 215b. In addition, duct 210 includes dual recess portions 217 formed between the conduit 212 and the flanges 215a, 215b. The recessed portions provide further duct flexibility for corner installation and bending.

In a preferred aspect, the duct 210 includes a rear surface 216 that has a generally flat surface shape. This flat surface provides suitable surface area for adhering the duct 210 to a mounting surface, a wall or other surface (e.g., finished dry wall or other conventional building material). In one aspect, surface 216 is backed with an adhesive layer 218, comprising a removable adhesive, such as a stretch release pressure sensitive adhesive (such as that described above), and having a removable liner 219. In use, the liner can be removed and the duct 210 can be applied to a mounting surface via adhesive layer 218.

A drop cable can be disposed within duct 210 and can be accessed and connected to the service line(s) at the access box 150 (see FIG. 3) or the base unit 180 (see FIG. 4). In one aspect, the drop cable comprises a tight bend radius, 900 μm buffered optical fiber. Such an optical fiber cable is commercially available as BendBright XS™ Single Mode Optical Fiber, from Draka Communications. Also in this aspect, an exemplary drop cable comprises a 2.9 mm jacketed drop cable commercially available as ez Patch cabling and ez Drop cabling from Draka Communications, or blown fiber cabling. A coupling or adapter can be used to connect the telecommunications service line to the drop fiber.

Figure 2B:
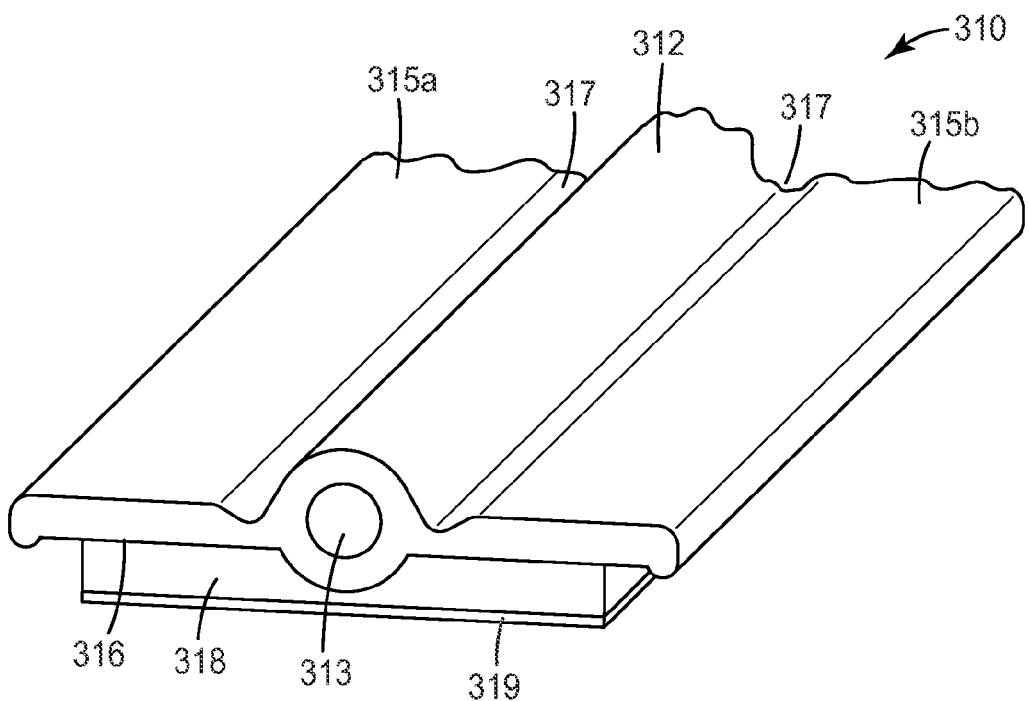
FIG. 2B is an isometric view of another exemplary duct according to another aspect of the invention.

In another aspect, an alternative duct 310 is shown in FIG. 2B. Duct 310, similar to duct 210, is an elongated structure that includes a bore 313 formed in the conduit portion 312. Duct 310 also includes a wing-shaped flange structure having a first flange 315a and a second flange 315b, both laterally extending from the conduit portion 312, to provide support for the duct 310 as it is installed on a wall or other generally flat surface. The duct 310 includes a rear surface 316 that has a generally flat surface shape. In addition, duct 310 includes dual recess portions 317 formed between the conduit portion 312 and the flanges 315a, 315b to provide further duct flexibility for corner bending. In this particular aspect, conduit portion 312 is formed centrally with respect the flange wings and with respect to the plane of the wing-shaped flanges 315a, 315b. The flanges 315a, 315b and surface 316 can be formed in the same manner as described above. As shown in FIG. 2B, a stretch release adhesive layer 318 with a removable liner 319 can be disposed on surface 316.

Figure 2C:
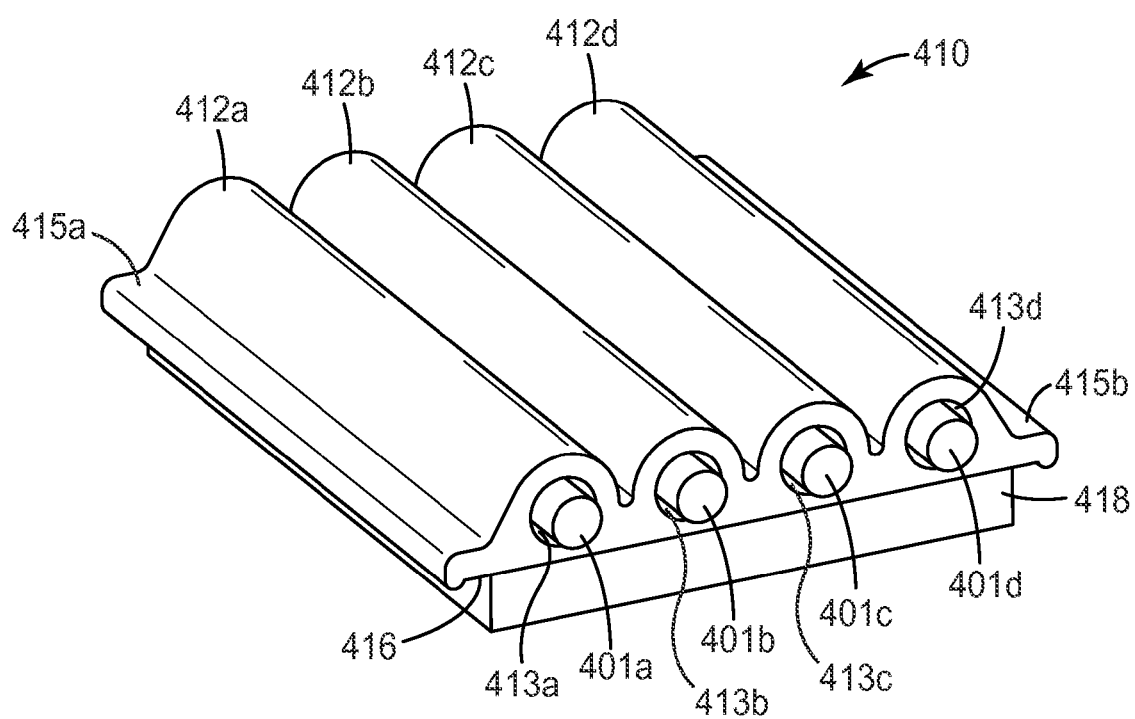
FIG. 2C is an isometric view of another exemplary duct according to another aspect of the invention.

FIG. 2C shows another alternative duct 410 that is utilized to carry multiple communication lines individually in separate conduit portions 412a-412d, each having a bore 413a-413d configured to house an individual line 401a-401d. Duct 410 also includes a flange structure having a first flange 415a and a second flange 415b, both laterally extending from the conduit portions to provide support for the duct 410 as it is installed on a wall or other generally flat surface. The duct 410 includes a rear surface 416 that has a generally flat surface shape. The flanges 415a, 415b and surface 416 can be formed in the same manner as described above. As shown in FIG. 2C, a stretch release adhesive layer 418 can be disposed on surface 416. The configuration of duct 410 can be particularly useful for living units in countries where multiple communication lines are required—the separate conduit portions allow for more straightforward installation.

In some aspects, the ducts described herein can be installed in an MDU or living unit using an installation tool such as is described in U.S. Patent Publication No. 2009/0324188, incorporated by reference herein in its entirety.

Referring back to FIG. 4, system 200 comprises one or more low profile access base units 180 (which can also be referred to herein as point-of-entry units), mountable over or onto at least a portion of the duct 110, 210, 310, 410, that are located at one or more access location points within the living unit to provide access to the horizontal cabling provided within the MDU. The unit 180 is disposed on a living unit wall 203 as shown in FIG. 3. The low profile access base/point-of-entry unit 180 can includes a cover and a wall-mounting portion, where the cover can have a low profile (with a circular, oval, rectangular, or other geometric outer shape) and/or decorative outer design for aesthetics within the living unit.

The drop fiber(s) can be coupled to the service provider line via a standard coupling located in a drop access box 150 (see FIG. 3) disposed in a hallway of the MDU. Alternatively, the drop fiber(s) can be coupled to the service provider line via a standard coupling located between the hallway wall and the interior wall 203 of the living unit, as is described in U.S. Patent Application 61/164,176, incorporated by reference herein in its entirety.

The terminated drop fiber(s) can be carried from the low profile access base unit 180 to a wall receptacle 290 via low profile duct 210 (or duct 310 or duct 410). In a preferred aspect, the duct 210 (or duct 310 or duct 410) is disposed along a wall, ceiling, under carpet, floor, or interior corner of the living unit in an unobtrusive manner, such that the aesthetics of the living unit are minimally impacted.

The wall receptacle 290 is configured to receive the drop fiber(s) and provide a connection with an optical network terminal (ONT) 295, such as a single family unit optical network terminal (SFU ONT), desktop ONT, or similar device (e.g., a 7342 Indoor Optical Terminal, available from Alcatel-Lucent or a Motorola ONT1120GE Desktop ONT). The wall receptacle 290 can be configured to provide one or more fiber connections using a conventional SC/APC connector(s) and/or jumpers 297 to the ONT 295. In one aspect, the wall receptacle can be placed from about 6 inches to about 10 inches, preferably about 8 inches, from the floor of the living unit. The wall receptacle 290 can also accommodate one or more data lines or electrical connections. An exemplary wall receptacle is described in International Publication No. WO 2008/124293, incorporated by reference in its entirety.

The example ducts 110, 210, 310, 410, 510 shown herein are but a few of the ducts that can be utilized in accordance with the present invention and are not meant to be limiting. Other duct designs and shapes can be utilized as would be apparent to one of ordinary skill in the art given the present description. For example, while many of the ducts described herein are shown having a symmetrical shape, the duct designs can be modified to have an asymmetric shape (such as a flange wider on one side than the other), as would be apparent to one of ordinary skill in the art given the present description.

Moreover, the ducts described herein may be coextruded with at least two materials. A first material can exhibit properties that afford protection of the optical fiber(s) within the conduit portion of each duct such as against accidental damage due to impact, compression, or even provide some protection against intentional misuse such as stapling. A second material can provide functional flexibility for cornering.

In some aspects, the ducts are typically extruded with a V0 flame resistant material, and can be of a material that is paintable, or in a further alternative, covered with another decorative material. In some applications, the ducts can often be filled with 900 μm buffer coated bend insensitive fibers that comply with ITU 652-D, ITU 657-A and ITU 657-B standards, though other fibers may be used such as 250 μm coated fibers, ribbon fibers of 2-fiber, 4-fiber or more, or even jacket fibers or bundled fibers.

Figure 7A:
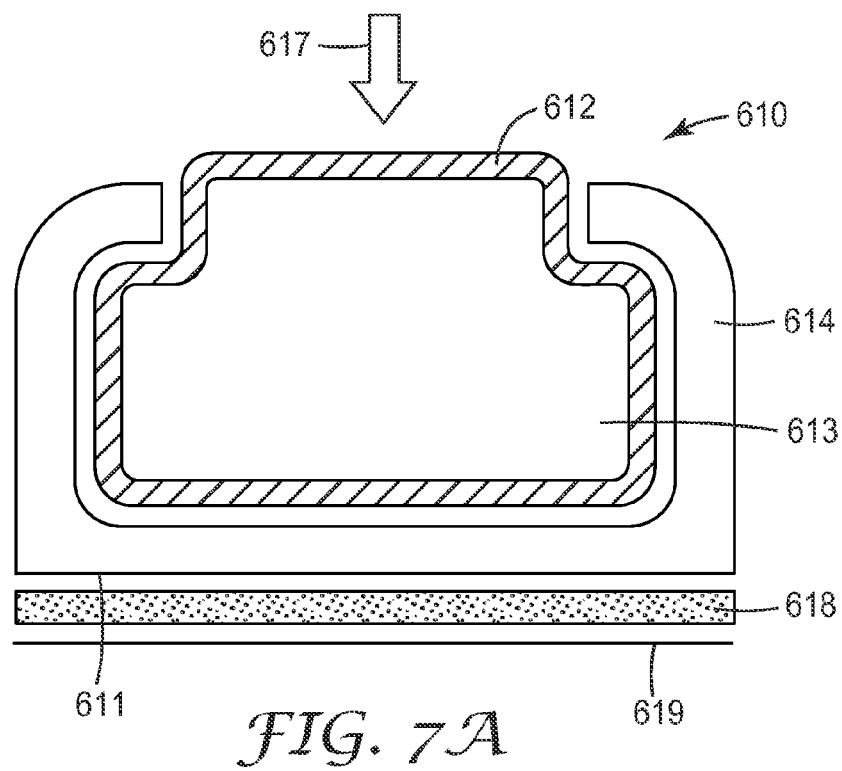
FIG. 7A is an end view of an alternative duct according to another aspect of the invention.

In another alternative aspect of the invention, an alternative duct 610 is shown in end view in FIG. 7A, with duct 610 having a two piece design that includes a main body and a mounting track that can be adhered to a mounting surface with a removable adhesive. In FIG. 7A, a main body 612 includes a conduit portion 613 that can be pre-populated with one or more optical fibers. The main body 612 can be formed from a material such as those described above, e.g., a polymeric material such as polyvinyl chloride (PVC). The main body 612 can be inserted (by pressing downward in the direction of arrow 617) into a base or mounting track 614, which is configured to snugly receive the main body 612. A removable adhesive layer 618, such as that described above, can be disposed on a mounting side 611 of the mounting track 614. The adhesive layer may include a releasable liner 619. In this alternative aspect, both the main body and the mounting track may be rigid structures or at least substantially rigid structures, with the arms of the mounting track having some flexure.

Figure 7B:
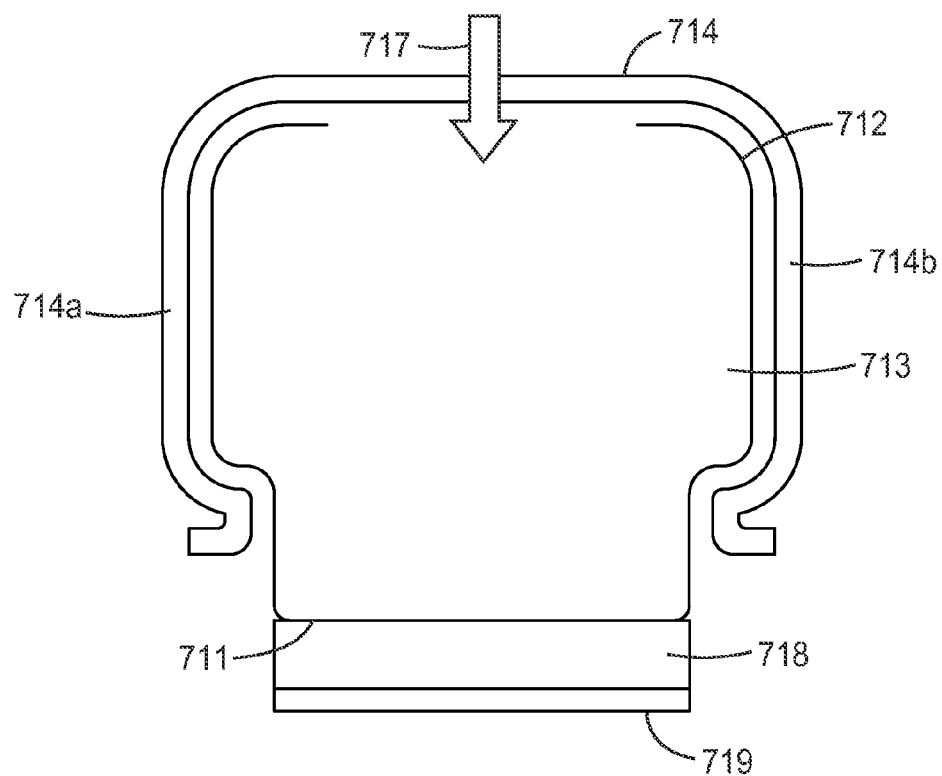
FIG. 7B is an end view of another alternative duct according to another aspect of the invention.

In a further alternative aspect, an alternative duct 710 is shown in end view in FIG. 7B, with duct 710 having a two piece design that includes a mountable main body having a removable adhesive and a cover. In FIG. 7B, a main body 712 includes a conduit portion 713 that can be pre-populated with one or more optical fibers. The main body 712 can be formed from a material such as those described above. A removable adhesive layer 718, such as that described above, can be disposed on a mounting side 711 of the main body 712. The adhesive layer may include a releasable liner 719. A cover 714, which is configured to snugly receive the main body 712, can be disposed over the main body 712 by pressing downward in the direction of arrow 717. In this alternative aspect, both the main body and the cover may be rigid structures or at least substantially rigid structures, with the arms 714a and 714b of the cover having some flexure.

Figure 8A:
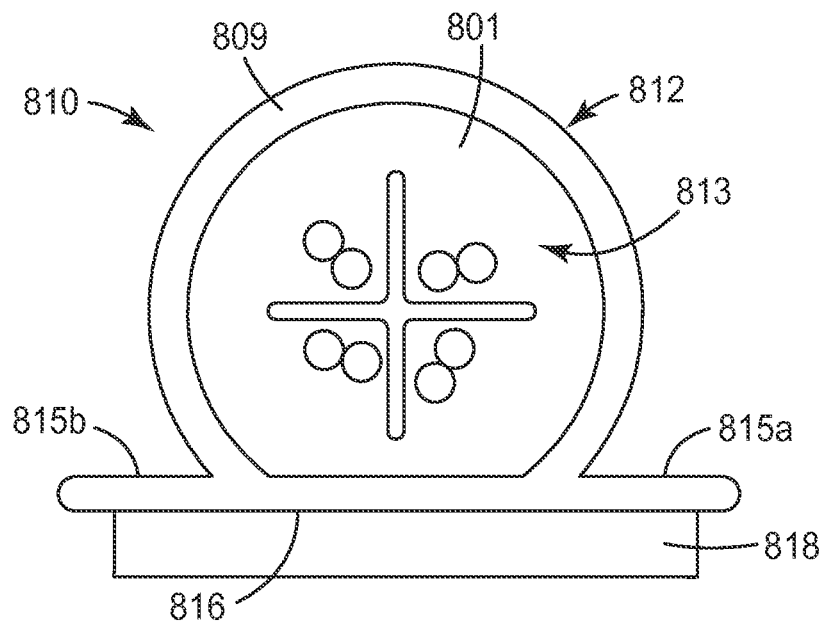
FIG. 8A is a front cross section view of another exemplary duct according to another aspect of the invention.

In a further alternative aspect, an alternative duct 810 is shown in FIG. 8A, which includes a conduit portion 812 having a bore 813 extending longitudinally therethrough. Duct 810 is an elongated structure that may have a length (L) of up to several tens of meters (depending on the application). The bore 813 is sized to accommodate one or more communication lines disposed therein. In this alternative aspect, the bore houses a high speed (gigabit rate) copper-based Ethernet communications line, such as a CAT 5 or CAT 6 (or future CAT "X")-type line 801, which may further include separators, foil, and/or other shielding elements. Further, in this alternative aspect, the outer portion 809 of conduit 812 also serves as the jacket of the CAT 5 or CAT 6-type line 801.

While conduit portion 812 can have a generally circular cross-section, in alternative embodiments it may have another shape, such as a rectangle, square, triangle, oval, or other polygonal shaped cross-section. In one aspect, duct 810 is a continuous structure formed from a polymeric material such as polyvinyl chloride (PVC), making it flexible, flame retardant and robust. In one aspect, duct 810 can comprise an exemplary material such as a polyurethane elastomer, e.g., Elastollan 1185A10FHF. In one aspect, duct 810 can comprise a polyolefin material that optionally includes one or more flame retardant additives. As such, duct 810 can be guided and bent around corners and other structures without cracking or splitting. Duct 810 can be continuously formed using a conventional extrusion process.

Duct 810 also includes a flange or similar flattened portion to provide support for the duct 810 as it is installed on or mounted to a wall or other mounting surface, such as a floor, ceiling, or molding. In most applications, the mounting surface is generally flat. The mounting surface may have texture or other structures formed thereon. In other applications, the mounting surface may have curvature, such as found with a pillar or column. The flange extends along the longitudinal axis of the duct. Exemplary duct 810 includes a double flange structure, with flange portions 815a and 815b, positioned (in use) below the centrally positioned conduit portion. In an alternative aspect, the flange can include a single flange portion. In alternative applications, a portion of the flange can be removed for in-plane and out-of-plane bending.

In a preferred aspect, the flange 815a, 815b includes a rear or bottom surface 816 that has a generally flat surface shape. This flat surface provides a suitable surface area for adhering the duct 810 to a mounting surface, a wall or other surface (e.g., dry wall or other conventional building material) using an adhesive layer 818.

In a preferred aspect of the present invention, the adhesive layer 818 comprises a removable adhesive, such as a stretch release adhesive, such as those described above. As with the embodiments described above, even though the duct is removable, the adhesive is suitable for those applications where the user intends for the duct to remain in place for an extended period of time.

Figure 8B:
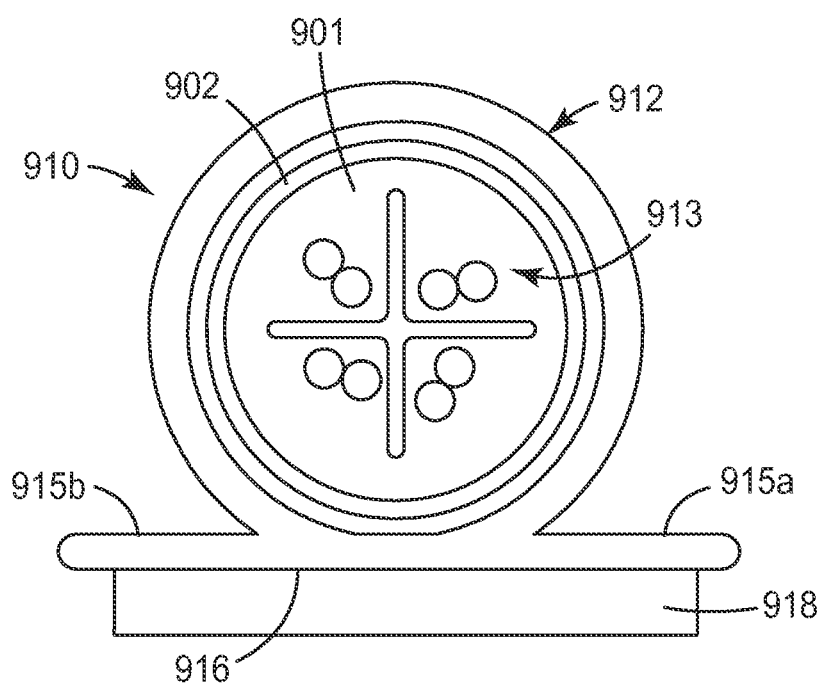
FIG. 8B is a front cross section view of another exemplary duct according to another aspect of the invention.

In a further alternative aspect, an alternative duct 910 is shown in FIG. 8B, which includes a conduit portion 912 having a bore 913 extending longitudinally therethrough. Duct 910 is an elongated structure that may have a length (L) of up to several tens of meters (depending on the application). The bore 913 is sized to accommodate one or more communication lines disposed therein. In this alternative aspect, the bore houses a high speed (gigabit rate) copper-based Ethernet communications line, such as a CAT 5 or CAT 6 (or future CAT "X")-type line 901, which may further include separators, foil, and/or other shielding elements. In this alternative aspect, the CAT 5 or CAT 6-type line 901 includes an outer jacket 902, such that the entire Ethernet cable is disposed within bore 913.

While conduit portion 912 can have a generally circular cross-section, in alternative embodiments it may have another shape, such as a rectangle, square, triangle, oval, or other polygonal shaped cross-section. In one aspect, duct 910 can be formed from the duct materials described above. As such, duct 910 can be guided and bent around corners and other structures without cracking or splitting. Duct 910 can be continuously formed using a conventional extrusion process.

Duct 910 also includes a flange or similar flattened portion to provide support for the duct 910 as it is installed on or mounted to a wall or other mounting surface, such as those described above. The flange extends along the longitudinal axis of the duct. Exemplary duct 910 includes a double flange structure, with flange portions 915a and 915b, positioned (in use) below the centrally positioned conduit portion. In an alternative aspect, the flange can include a single flange portion. In alternative applications, a portion of the flange can be removed for in-plane and out-of-plane bending.

In a preferred aspect, the flange 915a, 915b includes a rear or bottom surface 916 that has a generally flat surface shape. This flat surface provides a suitable surface area for adhering the duct 910 to a mounting surface, a wall or other surface (e.g., dry wall or other conventional building material) using an adhesive layer 918. In a preferred aspect of the present invention, the adhesive layer 918 comprises a removable adhesive, such as a stretch release adhesive, such as those described above. As with the embodiments described above, even though the duct is removable, the adhesive is suitable for those applications where the user intends for the duct to remain in place for an extended period of time.

As mentioned above, in a preferred aspect, the exemplary ducts described herein include a removable adhesive layer, such as a stretch release adhesive. Such a removable adhesive layer offers advantages over ducts that are mechanically fastened to walls or permanently adhered to walls, where removal of the duct would cause physical damage to the wall. Thus, in some applications, where a duct is mounted to a wall-papered or wall-covered wall, the duct of the present invention can be removed from the wall without disturbing or damaging the wall paper or wall covering.

Several exemplary removal processes are described with reference to FIG. 5. FIG. 5(a) shows an exemplary duct 510 that includes a removable adhesive layer 518 adhered to wall 503. In this example, adhesive layer 518 can comprise a stretch release adhesive such as described above. The mounted duct 510 is a flexible, elongated structure, having a length much greater than its width. As mentioned previously, a form factor (L vs. W) of at least 25 to 1, or at least 50 to 1, or at least 100 to 1 can be typical for these applications.

To initiate removal of duct 510 from wall 503, a user can cut off a small portion of the conduit and flange portions of duct 510 with a cutting tool at end 511 shown in FIG. 5(b). The user can then pull the exposed adhesive layer portion 522 along its length in the direction of arrow 504 to begin stretching the adhesive layer. Alternatively, duct 510 may have a preformed tab or other exposed member that can be pulled.

As the investigators have discovered, for a duct that is adhered to a rigid mounting surface such as a wall, pulling on the adhesive layer only along its length in the direction of arrow 504 may lead to the elongated adhesive re-adhering to wall 503, or to the duct 510, or to both. Such reattachment can make it much more difficult to remove the duct and can increase the chances of damaging the wall or other mounting surface. This reattachment may occur more frequently as the adhesive layer is stretched to or near to its breaking or tearing point, beyond which the adhesive layer will not easily stretch further. For rigid or substantially rigid ducts, reattachment may be more prevalent.

Figure 6A:
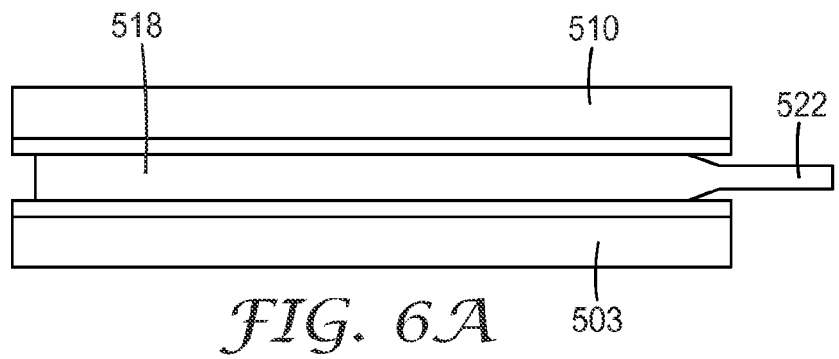
FIG. 6 is a set of schematic side views illustrating reattachment situations.
Figure 6B:
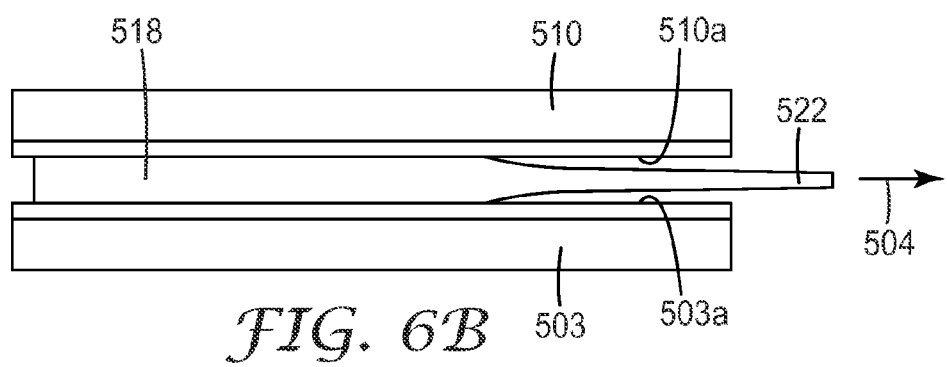
Figure 6C:
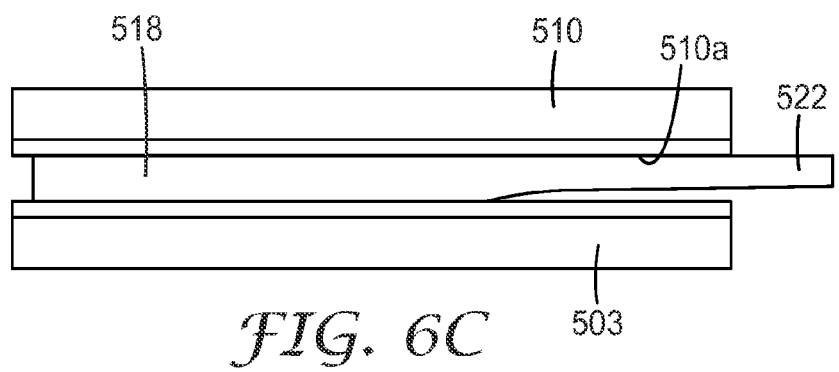
Figure 6D:
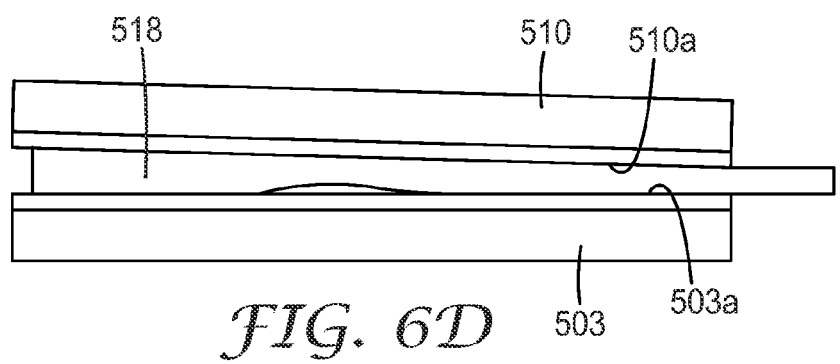

For example, as shown in FIG. 6 in a series of schematic side views, an exposed adhesive portion (or tab) 522 (see FIG. 6(a)) can be stretched along its length in the direction of arrow 504 (FIG. 6(b)) causing separation of the adhesive layer 518 from the duct (duct portion 510a) and the wall or mounting surface (portion 503a). Maintaining this separation, or gap, is important for suitable removal of the adhesive layer. If adhesive layer 518 is stretched to near its breaking limit, reattachment at such high extension can occur as the adhesive layer 518 reattaches to the duct (portion 510a, as shown in FIG. 6(c)) or to the wall 503 (not shown), or to both the duct (portion 510a) and the wall (portion 503a, as shown in FIG. 6(d)). Subsequent pulling in the direction of arrow 504 may not yield de-bonding and can cause tearing, which can prevent removal of the remainder of adhesive layer 518.

Figure 5:
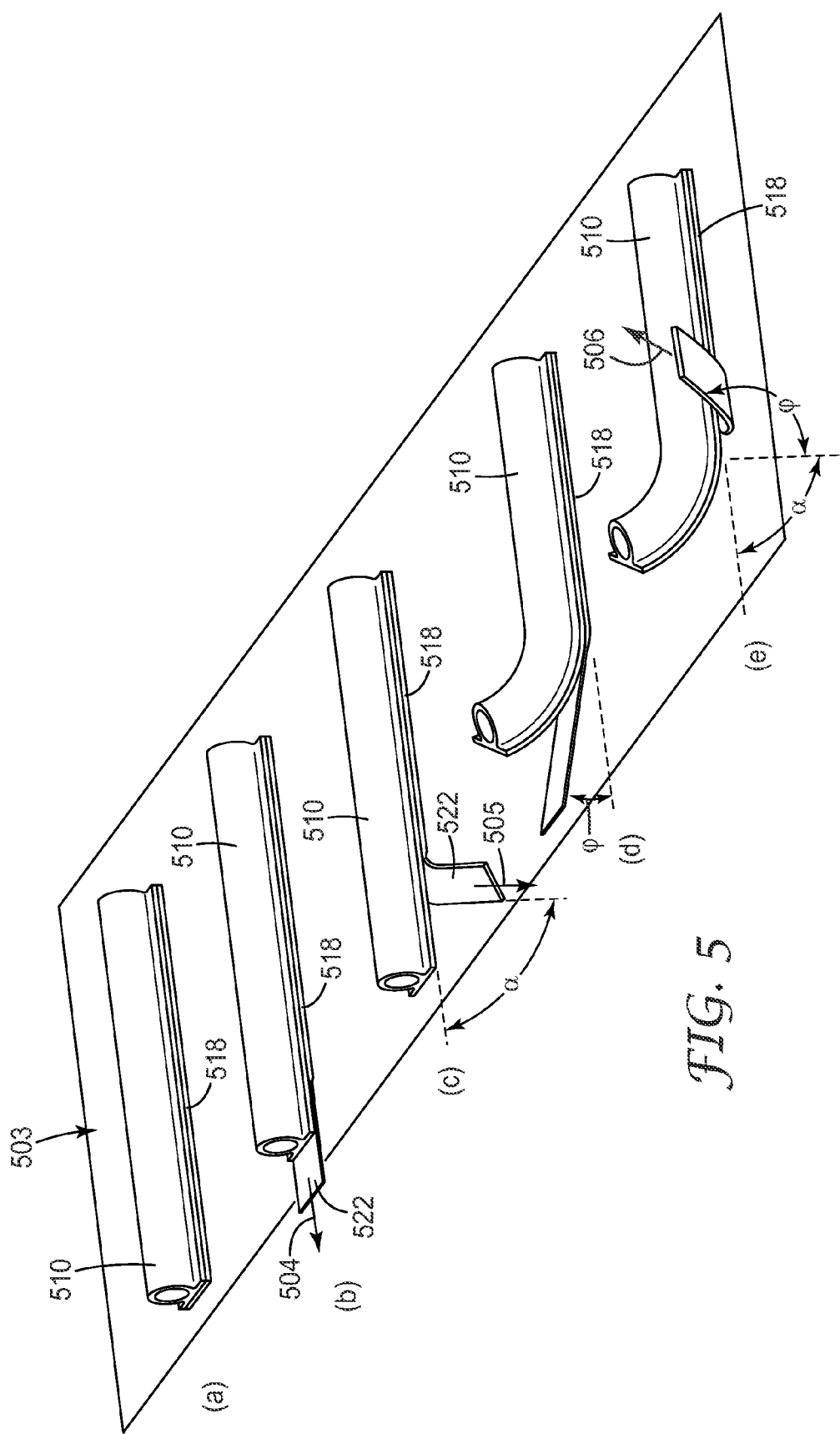
FIG. 5 is a schematic view of several methods of removing duct according to other aspects of the invention.

Referring back to FIG. 5, in one preferred removal process, such as shown in FIG. 5(c), exposed portion 522 can be pulled in the direction of arrow 505, substantially along the plane of wall 503 and at an angle α from the length direction (arrow 504) of the duct 510. This process can maintain the gap formed between the adhesive layer and the duct and the gap formed between the adhesive layer and the wall 503. Angle α is preferably a substantial angle of at least 30° from the length direction, and more preferably angle α is a substantial angle of from about 45° to about 135°. When pulling the adhesive layer in this manner, the duct and adhesive layer can be removed from wall 503 with only modest force and with a reduction in the likelihood that the duct will re-adhere to the wall 503. The process of FIG. 5(c) can be useful for both flexible and rigid or substantially rigid ducts. In addition, for a duct having more than one adhesive layer, such as duct 110' shown in FIG. 1B, that is mounted to wall 503, the adhesive layers (e.g., layers 518a and 518b) may be pulled in substantially opposite directions in the plane of wall 503. The adhesive layers may be pulled simultaneously or at different times. Alternatively, the adhesive layers may be pulled in the same general direction in the plane of wall 503 at different times or at the same time, with one adhesive layer laterally staggered from the other during the pulling process.

In addition, as shown in FIG. 5(d), in another process, the exposed portion 522 of the adhesive layer can be pulled in line with the length of the duct, but at an angle φ away from the plane of the wall. The duct 510, when flexible, can also be pulled in line with the length of the duct but at a greater angle from the plane of the wall and away from the adhesive layer. Angle φ is preferably a substantial angle of from about 5° to about 35°.

In another exemplary process, as shown in FIG. 5(e), the exposed portion 522 can be pulled in an angle α that is substantially along the plane of wall 503 and at an angle φ from the plane of the wall. This process can be useful in the event that a structure or other obstacle prevents pulling the adhesive layer in the plane of the wall at certain areas of the wall. As is shown in FIG. 5(e), for a flexible duct, the duct can be bent and removed in a straightforward manner. Angle α is preferably a substantial angle of from about 30° to about 135° and angle φ is preferably a substantial angle of from about 5° to about 35°.

As mentioned above, the present invention is not necessarily limited to ducts having one or more communication lines, but more generally provides a removable adhesive backed article that can be utilized in communication-based or non-communication based applications as well. The article can include a removable adhesive layer which allows a user to remove the article in a straightforward manner after it has been mounted to a mounting surface or similar substrate. For example, an article such as a corner mounting piece can be mounted via removable adhesive to a corner of a living unit or hallway to provide further support for the duct. In another example, paneling, molding, crown molding, and/or weather stripping can be mounted to a wall or other mounting surface via a removable adhesive such as described above. In this manner, removal of such an article can be accomplished with minimal to no damage to the mounting surface. These articles may also have very small form factor (L v. W) aspect ratios with large surface areas (relative to the width of the removable adhesive). For example, a frame, such as a picture or mirror frame can be mounted utilizing several strips of removable adhesive, with each removable adhesive strip disposed on a bottom or backside perimeter surface. Other articles, such as monitors and screens may also be mounted in accordance with the principles described herein. Removal of these articles from a wall or other mounting surface can be achieved with minimal change in the wall surface, in particular with no damage, and little or no adhesive residue.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A duct for distributing one or more communication lines, comprising:
    an elongated body formed from an extruded polymeric material having a length and a conduit portion with a lengthwise bore formed therein, the conduit portion disposed on a first surface of a flange structure extending lengthwise adjacent the elongated body to mount the duct to a mounting surface, the conduit portion being pre-populated with one or more communication lines;
    an adhesive layer disposed on a second surface of the flange, the second surface being opposite the first surface, the adhesive layer comprising a removable adhesive to permit removal of the duct from the mounting surface after mounting.

2. The duct of claim 1, wherein the adhesive layer comprises a stretch release adhesive.

3. The duct of claim 2, wherein the stretch release adhesive comprises one of an acrylic-based adhesive, a rubber-based adhesive, and a silicone-based adhesive.

4. The duct of claim 2, wherein the stretch release adhesive comprises a highly extensible backing.

5. The duct of claim 1, wherein the elongated body has a form factor (length versus width) of at least 25 to 1.

6. The duct of claim 1, wherein the duct includes at least one additional conduit, wherein the first conduit is configured to contain at least a first optical fiber communication line and the additional conduit is configured to contain at least a second optical fiber communication line.

7. The duct of claim 1, wherein the one or more communication lines includes an electrical wire.

8. The duct of claim 1, wherein the one or more communication lines comprises a high speed Ethernet communication line.

9. A removably mountable article, comprising:
    an article being pre-populated with one or more communication lines having an elongated body formed from an extruded polymeric material having a conduit portion with a lengthwise bore formed therein having a form factor (length versus width) of at least 25 to 1 and a bottom surface along a length of the elongated body; and
    an adhesive layer disposed on the bottom surface of the article, the adhesive layer comprising a removable adhesive to permit removal of the article from a mounting surface after mounting.

10. The removably mountable article of claim 9, wherein the elongated body is formed from a flexible material.

11. The removably mountable article of claim 9, wherein the elongated body is formed from a material that is at least substantially rigid.

12. The removably mountable article of claim 9, wherein the elongated body has a form factor (length versus width) of at least 50 to 1.

13. The removably mountable article of claim 9, wherein the adhesive layer comprises a stretch release adhesive.

14. The removably mountable article of claim 13, wherein the stretch release adhesive comprises one of an acrylic-based adhesive, a rubber-based adhesive, and a silicone-based adhesive.

15. The removably mountable article of claim 13, wherein the stretch release adhesive comprises a highly extensible backing.

* * * * *